(12) United States Patent
Nichols et al.

(10) Patent No.: US 6,356,557 B1
(45) Date of Patent: Mar. 12, 2002

(54) HOT INSERTABLE UTOPIA INTERFACE WITH AUTOMATIC PROTECTION SWITCHING FOR BACKPLANE APPLICATIONS

(75) Inventors: Stephen J. Nichols, Madison; Cuong T. Luu, Kensington, both of CT (US)

(73) Assignee: Ahead Communications Systems, Inc., Middlebury, CT (US)

( * ) Notice: Subject to any disclaimer, the term of this patent is extended or adjusted under 35 U.S.C. 154(b) by 0 days.

(21) Appl. No.: 09/172,545

(22) Filed: Oct. 14, 1998

(51) Int. Cl.[7] ................... H04L 12/403; H04L 12/28; G06F 13/00
(52) U.S. Cl. .................. 370/449; 370/395; 709/100
(58) Field of Search ................... 370/395, 449, 370/451, 463, 465, 475, 450, 360, 362, 365, 535–538, 411–418, 474; 710/100, 103, 109–110, 220

(56) References Cited
U.S. PATENT DOCUMENTS 5,485,456 A * 1/1996 Shtayer ..................... 370/395
5,960,179 A * 9/1999 Hagersten ................... 710/100

* cited by examiner

Primary Examiner—Wellington Chin
Assistant Examiner—Steven Nguyen

(57) ABSTRACT

A modified UTOPIA interface for inter-board applications is provided where the address timing generated by a polling master is extended to be two clock cycles long with no NULL address being driven onto the address line in between addresses. Output and input circuitry is provided in conjunction with the polling master and user ATM boards to accommodate hot insertion and to help drive the circuit. The master preferably includes an outgoing address latch and address latch control associated with the address bus, and a register associated with the enable signal. The master also includes a hot insertion buffer on the incoming cell available signal. The user device(s) include hot insertion buffers on the address bus, the data bus, and the enable signal. A remapping function is also preferably provided in associated with the user board which permits the user board to map received addresses into desired addresses. With the extended address timing and the provided circuitry, a workable inter-board hot-insertable UTOPIA interface is established.

20 Claims, 7 Drawing Sheets

| ROW | MAX nsec | COMMENT |
| --- | --- | --- |
| 1 | 12 | TxClk to TxAddr valid (for 20 pf load) |
| 2 | 4 | TxClk to TxLE active |
| 3 | 5 | TxLE active to TxLO (latch output) valid |
| 4 | 12 | TxClav seen by ALM |
| 5 | 12 | TxClk to TxEnb* active (for 20 pf load) |
| 6 | 5 | TxClk to TxEnbReg* active |
| 7 | 15 | TxClk to TxData valid |
| 8 | 15 | TxClk to TxSOC valid |
| 9 | 5 | TxClk to TxDataReg valid |
| 10 | 5 | TxClk to TxSOCReg valid |

*FIG. 5A*

| ROW | MAX nsec | COMMENT |
| --- | --- | --- |
| 1 | 12 | RxClk to RxAddr valid (for 20 pf load) |
| 2 | 4 | RxClk to RxLE active |
| 3 | 5 | RxLE active to RxLO (latch output) valid |
| 4 | 12.5 | RxClav seen by RCPM |
| 5 | 12 | RxClk to RxEnb* active (for 20 pf load) |
| 6 | 5 | RxClk to RxEnbReg* active |
| 7 | 14 | RxClk to RxData valid |
| 8 | 14 | RxClk to RxSOC valid |
| 9 | 5 | RxClk to RxDataReg valid |
| 10 | 5 | RxClk to RxSOCReg valid |

*FIG. 5B*

HOT INSERTABLE UTOPIA INTERFACE WITH AUTOMATIC PROTECTION SWITCHING FOR BACKPLANE APPLICATIONS

BACKGROUND OF THE INVENTION

1. Field of the Invention

The present invention relates to telecommunications. More particularly, the present invention relates to the passing of high speed Asynchronous Transfer Mode (ATM) data over a standardized Universal Test and Operations Physical Interface for ATM (UTOPIA) bus.

2. State of the Art

Perhaps the most awaited, and now fastest growing technology in the field of telecommunications in the 1990's is known as ATM technology. ATM is providing a mechanism for removing performance limitations of local area networks (LANs) and wide area networks (WANs) and providing data transfers at a speed of on the order of gigabits/second. Within the ATM technology, a commonly used interface specification between chips on a board for passing ATM cells is the UTOPIA interface. The UTOPIA interface is specified in ATM Forum standard specification af_phy_0039.000 (UTOPIA Level 2, Version 1, June 1995) which is hereby incorporated by reference herein in its entirety.

Prior art FIG. 1 shows a typical intraboard ATM application of the UTOPIA interface. In particular, on a single board 11, an ATM layer chip 15 is coupled to a physical layer chip 17 which is shown to include a plurality of physical devices 19a–19d. The ATM layer chip 15 and physical layer chip 17 utilize the UTOPIA interface, which includes a five bit address bus 21, a seventeen bit data/start-of-cell bus 23 (sixteen bits used for data), an enable line (one bit signal) 25, and a cell available line (one bit signal) 27. The physical layer chip 17 is provided with two address registers 31, 33, a multiplexer 35 and a demultiplexer 37.

The application shown in prior art FIG. 1 functions in the following manner using the timing shown in prior art FIG. 2. The ATM layer chip 17 utilizes a clock such as a 50 MHz clock, and polls the physical layer devices for data by sequentially sending an address (of a physical device), followed by a NULL address (all ones), followed by a next address, followed by a NULL address, followed by a next address, etc. According to the UTOPIA interface standard, when a physical device is in a state in which it can receive data, it provides a cell available signal to the multiplexer 35. The address received by the address register 31 is used as a select for the multiplexer 35. Thus, when a particular physical device is selected, if it can receive data, a cell available signal is provided back to the ATM layer chip over the cell available line 27. After polling is completed, the ATM layer chip 17 (or a processor coupled thereto) determines which physical device (address) is to receive the data. It then sends the address of the recipient over the address bus 21 in conjunction with an enable signal over line 25. The selected address is clocked by the enable line into the address register 33. The address register 33 is used as a control for the demultiplexer 37 which selects the physical device 19 which is to receive the data. The data (including the forty-eight byte payload of a cell) is then sequentially forwarded over the data bus 23 while a next sequential polling is performed over the address bus.

While the UTOPIA interface has proved to be very useful for interfacing two chips on a single board (intra-board), the UTOPIA interface has not been applicable across boards (inter-board) apparently because of both timing and "hot insertion" problems which can be encountered. In particular, OC-12 (622 Mbps) and four-port OC-3 (155 Mbps) standards require that the UTOPIA interface operate at up to a 50 MHz clock rate. However, many existing devices with UTOPIA interfaces have large propagation delays and inadequate drive capability for backplane applications (i.e., inter-board connections) operating at this clock rate. In addition, in inter-board applications, it is possible that one board is already functioning as the other board is being inserted ("hot insertion"), leading to the possibility of electrical shorting and damaging of components, and the provided UTOPIA interface standard does not provide a mechanism to deal with this problem. Thus, the UTOPIA specification is inadequate to cover inter-board interfaces. Indeed, the ATM Forum Standard committee apparently understood this problem and specifically stated in the standard that the backplane applications of the UTOPIA bus are "for further study".

SUMMARY OF THE INVENTION

It is therefore an object of the invention to provide a UTOPIA interface enhancement which permits inter-board UTOPIA interfaces to function properly.

It is another object of the invention to provide a modified UTOPIA interface which is hot insertion tolerant.

In accord with the objects of the invention, a modified UTOPIA interface for inter-board applications is provided where the address timing generated by a polling master is extended to be two clock cycles long with no NULL address being driven onto the address line in between addresses. In addition, additional output and input circuitry is provided in conjunction with the master and user ATM boards to accommodate hot insertion and to help drive the circuit. The output circuitry provided in conjunction with the master preferably includes an outgoing address latch and address latch control associated with the address bus, and registers associated with the enable signal and the data bus. The input circuitry preferably provided in conjunction with the master includes a buffer on the cell available signal. The input circuitry preferably provided in conjunction with the user device(s) includes buffers on the address bus, the enable signal and the data bus. A remapping function is also preferably provided in associated with the user board which permits the user board to map received addresses into desired addresses. With the extended address timing and the provided circuitry, a workable inter-board hot-insertable UTOPIA interface is established.

Additional objects and advantages of the invention will become apparent to those skilled in the art upon reference to the detailed description taken in conjunction with the provided figures.

BRIEF DESCRIPTION OF THE DRAWINGS

FIGS. 5a and 5b are charts relating to certain important timings noted in FIGS. 4a and 4b.

DETAILED DESCRIPTION OF THE PREFERRED EMBODIMENT

Figure 1:
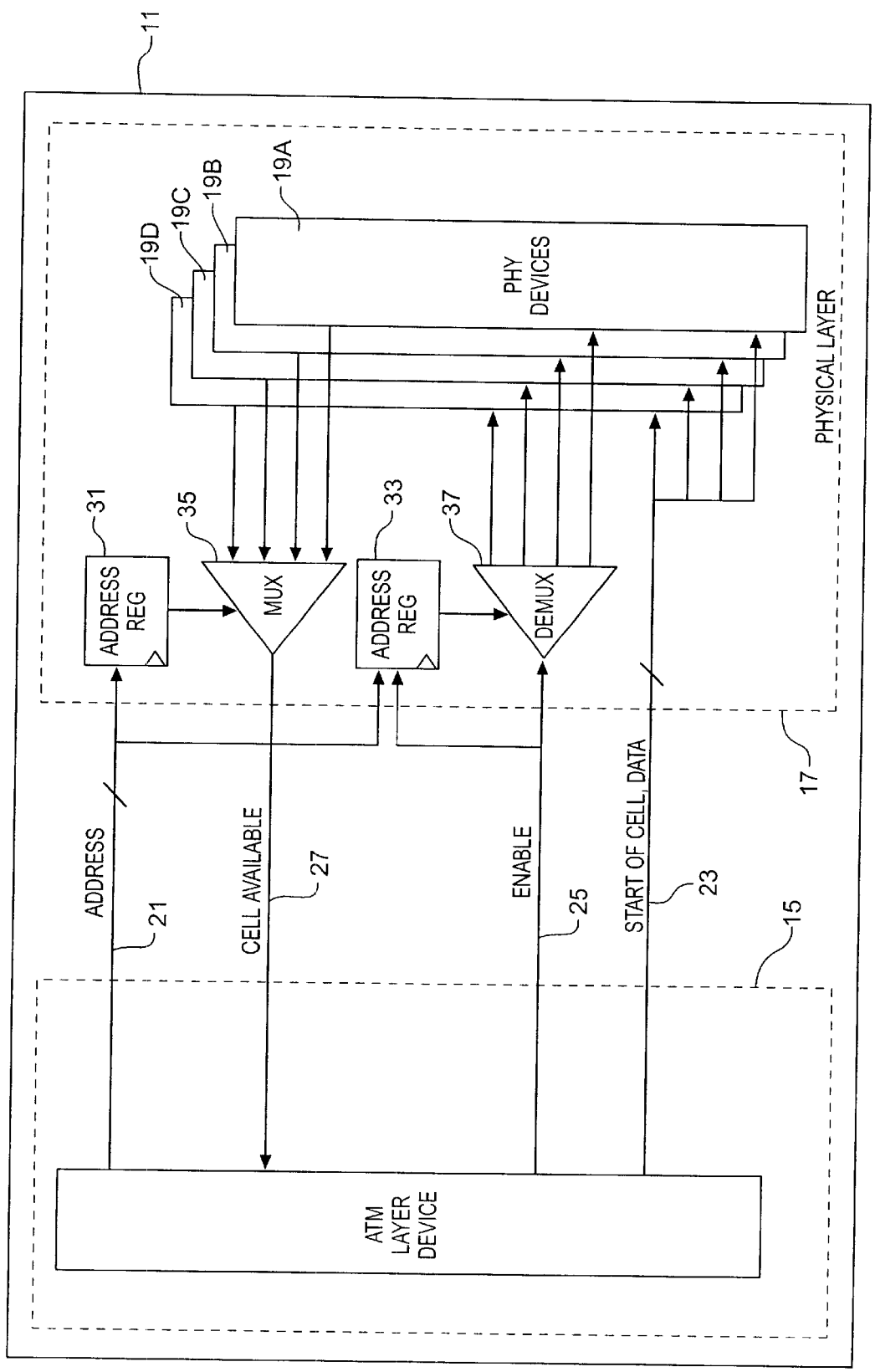
FIG. 1 is a schematic diagram of a prior art UTOPIA intraboard interface.
Figure 2:
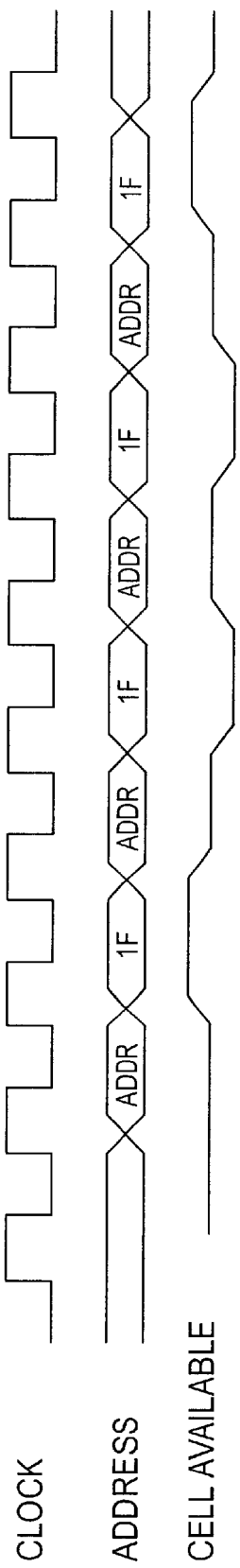
FIG. 2 is a prior art standard UTOPIA timing diagram associated with the UTOPIA interface of FIG. 1.
Figure 3A:
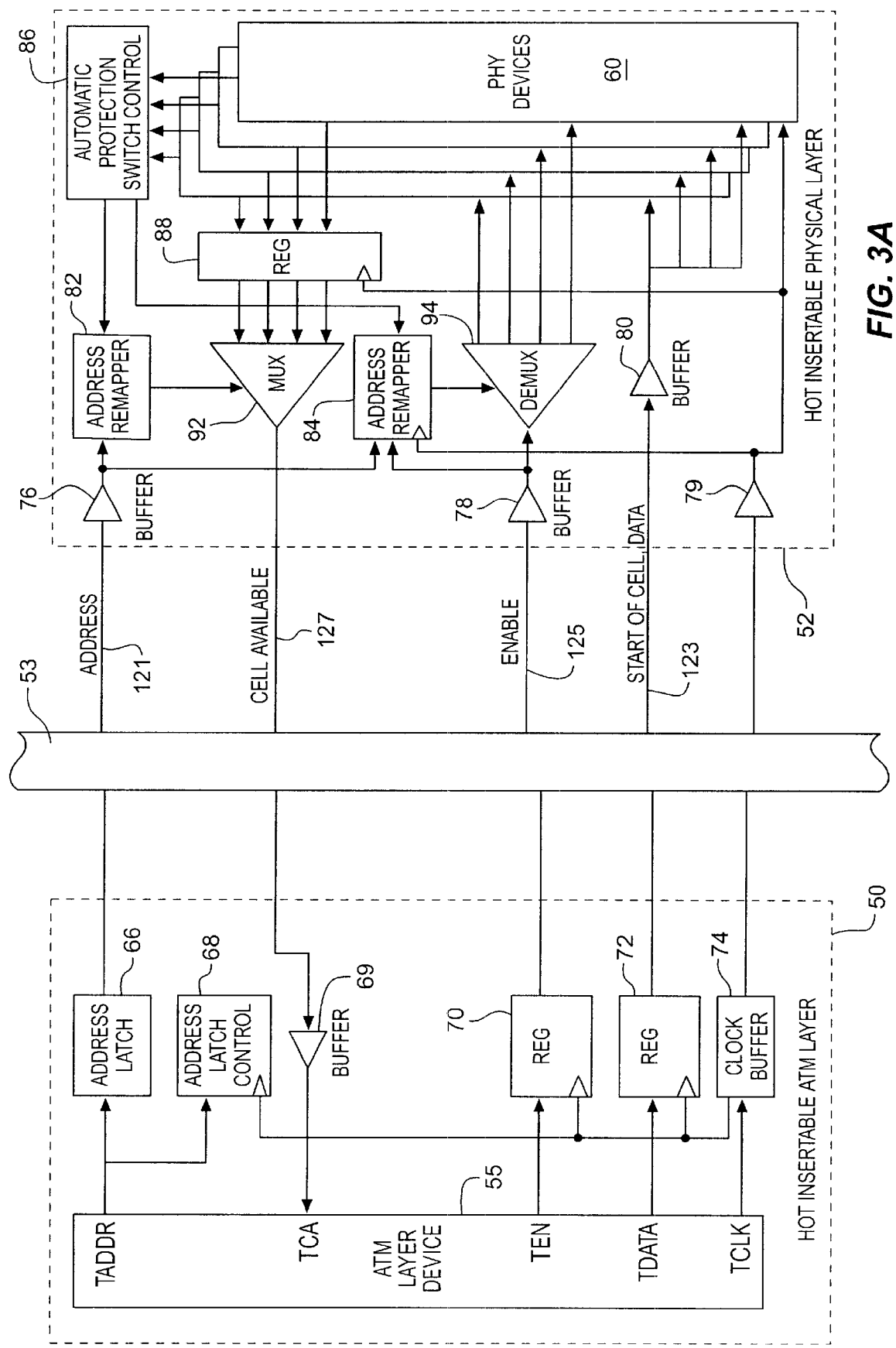
FIGS. 3a and 3b are schematic diagrams of the inter-board UTOPIA interface of the invention implementing transmit and receive functions respectively.

Turning to FIG. 3a, a schematic diagram of the presently preferred modified UTOPIA interface is seen. In FIG. 3a, two boards 50 and 52 are provided and are coupled together by, e.g., a connector 53. For purposes of illustration, one board 50 is shown to contain an ATM layer device 55 and associated modified-UTOPIA circuitry, while the other board 52 is shown to contain physical layer devices 60 and associated modified-UTOPIA circuitry. The circuitry on board 50 preferably includes an address latch 66 and address latch control 68 for the address bus 121, a buffer 69 for the cell available line 127, register 70 for the enable line 125, a register 72 for the data/start-of-cell bus 123, and a clock buffer 74. The circuitry on board 52 preferably includes a buffers 76, 78, 79 and 80 for the address bus, the enable line, the clock signal, and the data/start-of-cell bus respectively, two address remappers 82, 84, an automatic protection switch control block 86, a register 88 and multiplexer 92 associated with the cell available line 127, and a demux 94.

Figure 4A:
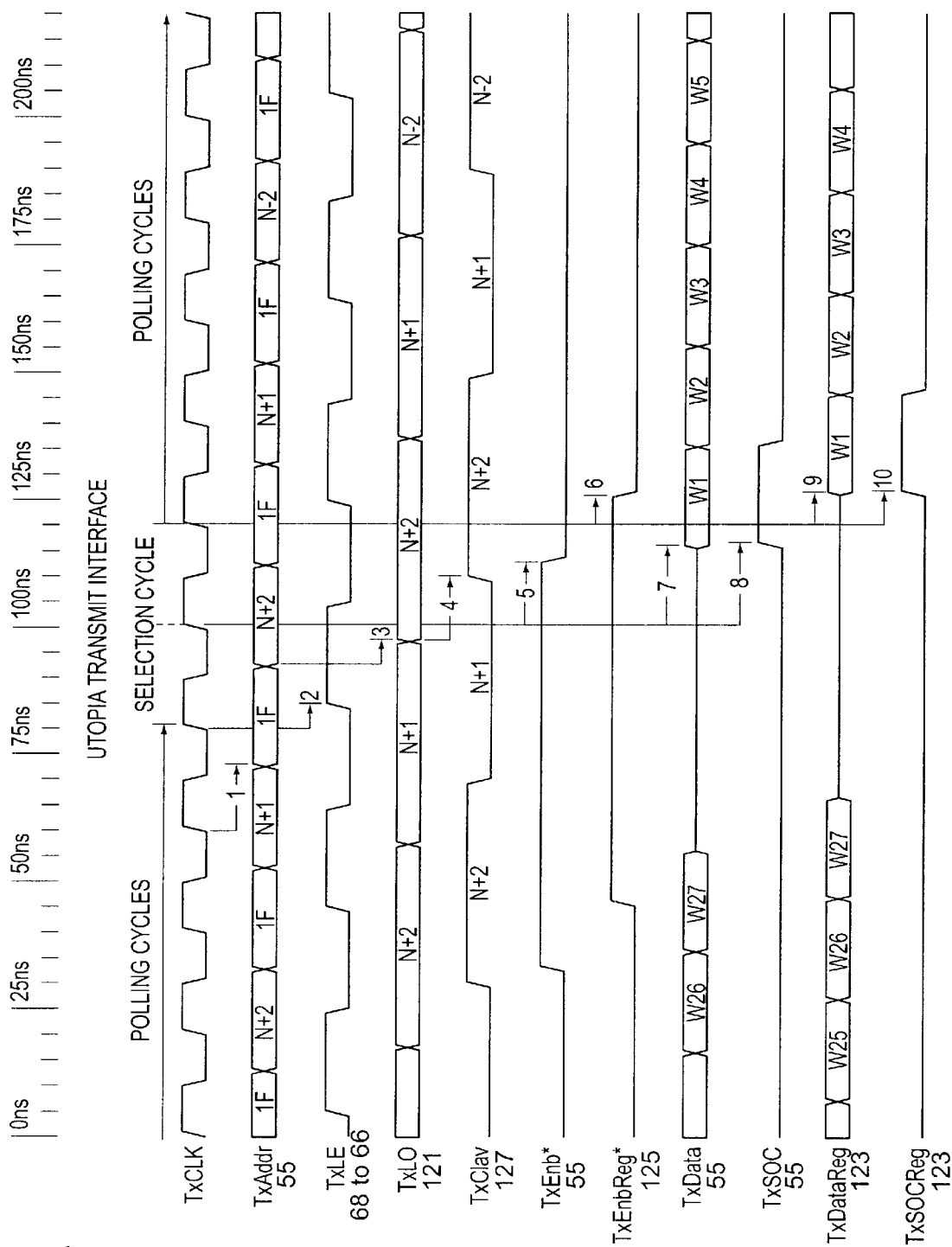
FIGS. 4a and 4b are timing diagrams for the inter-board UTOPIA interface in the transmit and receive directions respectively.

The functioning of the modified UTOPIA interface may be understood with reference to both FIGS. 3a and 4a. In accord with the UTOPIA interface specifications, the ATM layer device 55 outputs an address. According to the invention, this address is latched into the address latch 66. The address latch control 68 and address latch 66 represent a toggle circuit (signal TXLE of FIG. 4a representing the signal provided by latch control 68 to latch 66) such that the address provided during one clock cycle is held for two clock cycles (as seen in FIG. 4a as the transmitted latched output TXLO) by the address latch, while the NULL value provided in alternate clock cycles (as required by the UTOPIA standard and seen as "1F" in FIG. 4a) is effectively discarded. The latched address is provided via a buffer 76 (for hot insertion purposes) to the address remapper 82 which controls multiplexer 92. The address remapper 82 receives information from the automatic protection switch control block 86 which is coupled to the physical devices 60. With the provided arrangement, the address remapper 82 effects a remapping. More particularly, when a physical layer device is "down" and a redundant device of different address is available, the redundant device is utilized to service the data and data is remapped to the address of the redundant device.

When a physical device 60 is ready to receive a cell, a cell available signal is provided to the register 88 by the physical device. When a polling address is received by the address remapper 82 (and possibly remapped by the remapper 82), the remapper 82 controls the multiplexer 92 such that a cell available signal is provided by the appropriate physical device. The output from register 88 is high or low depending upon whether the physical device is ready to receive a cell. The cell available signal (TxClav in FIG. 4a) is provided via buffer 69 to the ATM layer device 55.

It should be appreciated that the ATM layer device 55 sequentially polls all of the physical devices 60 (as indicated by different addresses N+2, N+1, N−2, etc. in TxAddr of FIG. 4a). The time taken for polling may occur in a single frame or multiple frames, depending upon the number of physical devices which are being polled.

After the ATM layer device 55 has polled the physical devices 60, the ATM layer device 55, or a processor or circuitry coupled thereto, determines to which device it will send a cell of data. After the last byte or multiple-byte of data of the previous cell has been sent over the data bus 123, the address of the newly selected device is provided during the selection cycle (shown in FIG. 4a) to the address latch 66, and the enable register 70 is enabled (TxEnbReg of FIG. 4a). The receiving address is provided via buffer 76 to the address remapper 84 which controls the demultiplexer 94. When the enable signal is received by the demultiplexer 94 via hot insertion buffer 78 from the register 70, the physical device 60 corresponding to the receiving address is enabled. A new cell of data (TxData in FIG. 4a) is then sent via register 72, bus 123, and hot insertion buffer 80 to the enabled address. A start-of-cell signal (TXSOC in FIG. 4a) is provided for one clock cycle with the first word of the new cell (it being appreciated that the start-of-cell signal is preferably provided on its own thread of the data bus 123). It is noted that the cell enable register 70 is preferably provided in order to delay the enable signal from reaching the demultiplexer 94 until after the address as remapped by the address remapper 84 has had the opportunity to set the appropriate address, as discussed in more detail below.

The timing associated with the address polling, cell available signaling, enable signaling, and sending of data is a critical aspect of the present invention. In particular, according to the previously incorporated ATM Forum UTOPIA standard specification Section 2.5, the parallel interface should run at up to 50 MHz. With a 50 MHz clock rate, each clock cycle is equivalent to twenty nanoseconds. According to the requirements of the ATM Forum UTOPIA specification af-phy-0039.000, a cell available response sequence must be completed within forty nanoseconds from when the address is generated by the ATM layer device. According to the UTOPIA specification, the addressing and cell available response is a two-step process. In a first step, an address is generated and output from the ATM layer device and persists for twenty nanoseconds. During this period, the physical layer device must capture and store the address for use during the next twenty nanosecond period. In a second step, the cell available response from the physical layer is placed on the bus and captured by the ATM layer device within a twenty nanosecond period. Thus, each step must be accomplished in twenty nanoseconds. However, in inter-board communications, it is often not possible to accomplish the first step in twenty nanoseconds because of the amount of time it takes the ATM layer device to put the address on the bus (e.g., fifteen nanoseconds) plus the delays associated with the path as well as connector capacitive loading. In addition, in inter-board communications, hot insertion capability is desirable, and this capability typically adds additional delay. According to the invention, timing issues are resolved by extending the address clocking to two clock lengths, such that a cell available signal can be properly associated with the address of the physical device being polled. This is preferably accomplished through the use of the address latch control 68 and address latch 66 so that the ATM Forum UTOPIA standard requiring an address followed by a null address (1F) can be utilized. With the extended address clocking, forty nanoseconds are now available to complete the combination address output—cell available response sequence in one step. The forty nanoseconds accommodates a typical maximum fifteen nanosecond delay in generating the address for output by the ATM layer device 55, a typical maximum four nanosecond delay introduced by the address latch 66/latch control 68 circuit, a typical 0.25 nanosecond delay introduced by hot insertion buffer 76, a typical maximum five nanosecond delay introduced by the address remapper 82, a typical maximum seven nanosecond delay introduced by the multiplexer 92 in outputting the cell available signal, a typical 0.25 nanosecond delay introduced by hot insertion buffer 69, and a typical maximum additional two nanosecond delay introduced by the ATM layer device 55 in receiving the cell available signal; i.e., (15+4+0.25+5+7+0.25+2=33.5<40). This permits several nanoseconds delay for the connector 53 and buses carrying signals to and from the connector.

As aforementioned, register 70 is provided to introduce sufficient delay to permit the alignment of the enable signal with the last twenty nanoseconds of the address. This is seen in FIG. 4a, where the TxEnbReg signal is derived from the delayed TxEnb signal, and timing 6 of FIG. 4a which is noted in note 6 of FIG. 5a.

After the appropriate physical device has been enabled, data (represented in FIG. 4a by words W1, W2, W3 . . . ) may be sent by the ATM layer device 55 via register 72 and buffer 80 to the enabled physical device. While the data is being sent, the ATM layer device 55 starts the address polling process again, and the entire polling, response, selection, enabling, and data sending sequence is repeated.

The preferred exact timing of various signals utilized in the invention is shown in FIG. 4a which shows the end of one frame cycle, and the beginning of another frame cycle. Thus, FIG. 4a shows the last three words of data (W25, W26, W27) of an ATM cell being generated (TxData) and transmitted (TxDataReg) on e.g., sixteen threads of the data bus 123; a seventeenth thread being reserved for the start of cell signal—TxSOCReg. The end of this cell is followed by a selection cycle, which is followed by transmission of data (words W1, W2, W3 . . . ) to the newly selected address. During transmission of data, the polling of the various physical layer devices continues. Various important timing intervals are noted in FIG. 4a by reference numerals "1" through "10) and various arrows. The import of these timing intervals is set forth in FIG. 5a and will be understood by those skilled in the art.

Figure 3B:
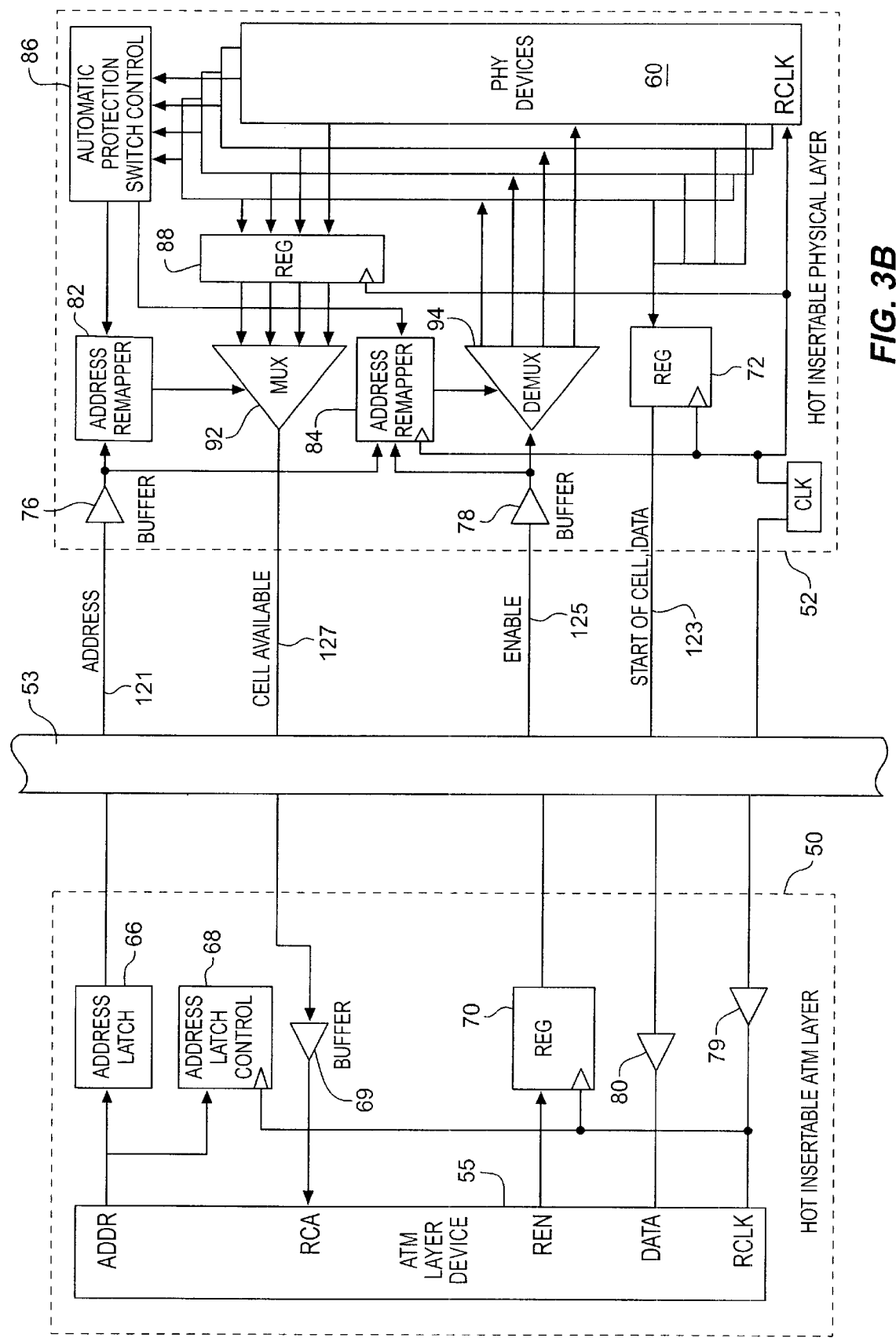
Figure 4B:
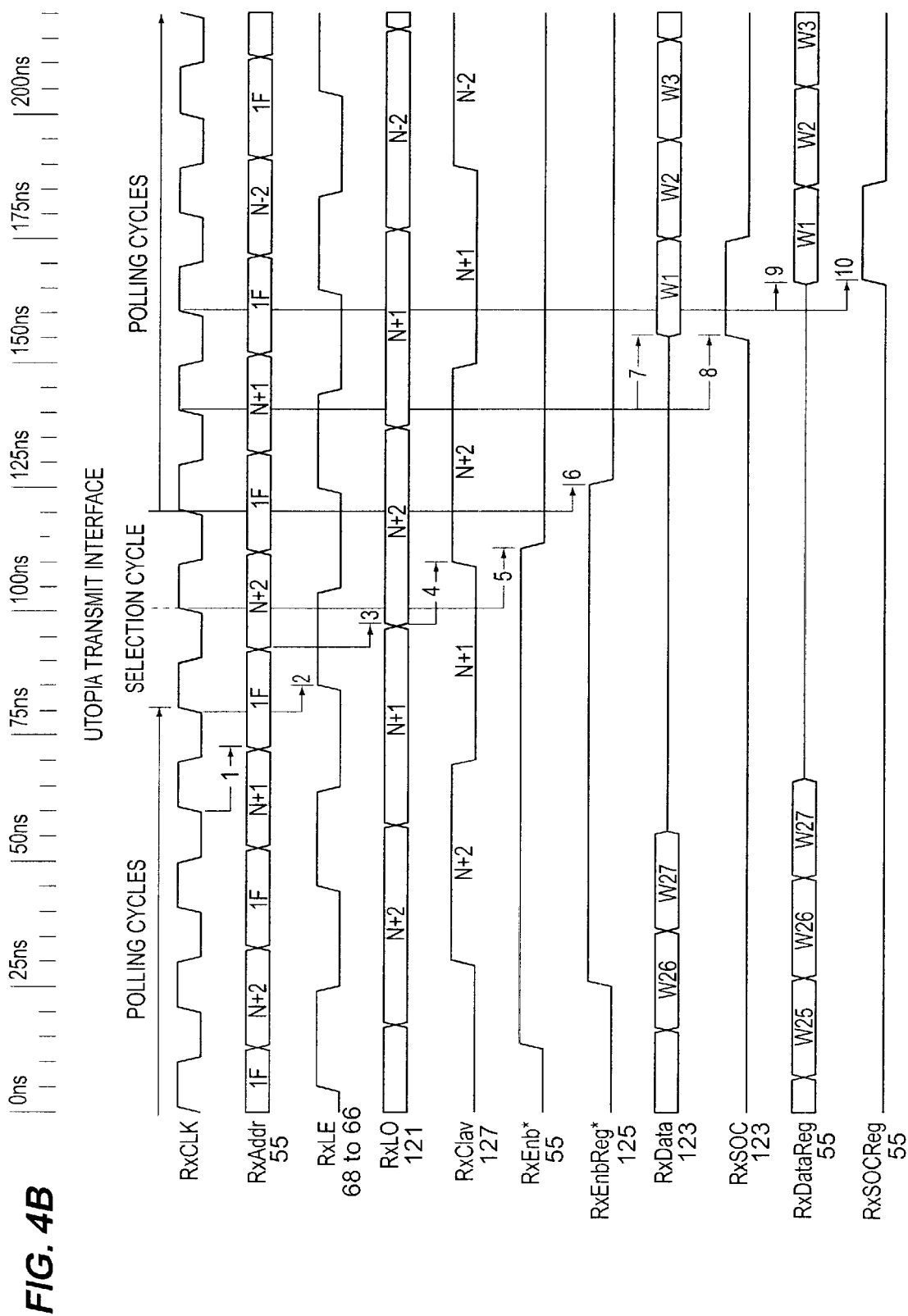

While FIGS. 3a and 4a are directed to the transmission of data from the ATM layer device 55 to the physical devices 60 (i.e., the "transmit" direction), it will be appreciated that the apparatus of the invention preferably includes circuitry which permits data to be directed from the physical devices 60 to the ATM layer device 55. The "receive" direction circuitry shown in FIG. 3b (with timing shown in FIG. 4b, and important timing intervals explained in FIG. 5b). The receive direction circuitry is substantially identical to the "transmit" direction circuitry except that (i) the data register 72 is located on the physical layer board 52 instead of on the ATM layer board 50; (ii) the associated data buffer 80 is located on the ATM layer board 50 instead of the physical layer board; (iii) the hot insertion clock buffer 79 is located on the ATM layer board 50 instead of the physical layer board 52; and (iv) the clock buffer 74 is located on 52.

As will be appreciated by those skilled in the art, the receive direction circuitry functions in substantially the same manner as the transmit direction circuitry, and the timing is nearly identical. The ATM layer board 50 generates polling addresses which are received by the physical layer board 52. If any of the physical devices have data to send (as registered in register 88), when the address of the physical device is polled, a cell available signal is generated and returned to the ATM layer board 50. After polling, the ATM layer board, or a processor associated therewith, determines which physical device will be enabled to send data. At an appropriate time, the address of the selected physical device is provided by the ATM layer board 50 to the physical layer board, and data is sent from the physical layer 52 to the ATM layer 50 over the data bus 123.

There have been described and illustrated herein a hot insertable UTOPIA interface for backplane applications. While particular embodiments of the invention have been described, it is not intended that the invention be limited exactly thereto, as it is intended that the invention be as broad in scope as the art will permit. Thus, while the invention has been described with respect to certain hardware, it will be appreciated that various functions can be carried in different hardware. For example, while an address latch and address latch control have been provided in order to accommodate the address followed by null address scheme of the prior art, it will be appreciated that if backwards compatibility is not required, different circuitry can be utilized to hold the provided address for two clock cycles; or, the polling addresses can be repeated twice. Further, while the invention was described as preferably enabling hot insertion, the invention can be utilized without certain buffers which enable the hot insertion. Similarly, while the invention was described as preferably enabling address remapping, such is not required. Therefore, it will be apparent to those skilled in the art that other changes and modifications may be made to the invention as described in the specification without departing from the spirit and scope of the invention as so claimed.

We claim:

1. An inter-board communication system where a master on a first board polls a plurality of users on at least one second board for allowing individual users to receive ATM data across an interface between said first board and said at least one second board substantially according to a UTOPIA protocol, comprising:

a) a clock;
   b) an address bus coupled to said first board and said at least one second board;
   c) address means on said first board and coupled to said address bus for placing addresses on said address bus, each address for two immediately adjacent cycles of said clock, and for thereby polling the users on said at least one second board regarding their availability to receive data;
   d) a data bus coupled to said first board and said at least one second board;
   e) means on said first board for placing ATM cell data onto said data bus according to said clock, wherein said address means places addresses on said address bus while said means for placing ATM cell data places the ATM cell data onto said data bus.

2. An inter-board communication system according to claim 1, further comprising:

f) means on said at least one second board for generating a cell available signal in response to said polling when said addressed user is available to receive data, and for supplying said cell available signal to said master.

3. An inter-board communication system according to claim 2, further comprising:

g) means on said first board for generating an enable signal and for supplying said enable signal to said at least one second board; and
   h) means on said at least one second board for enabling one of said plurality of users to receive data based on an address on said address bus when said enable signal is received by said second board.

4. An inter-board communication system according to claim 3, wherein:

said means for generating a cell available signal and for supplying a cell available signal includes a third cell available signaling bus, and
   said means for generating an enable signal and for supplying said enable signal includes a fourth enable signaling bus.

5. An inter-board communication system according to claim 4, further comprising:

a plurality of buffer means for hot insertion buffering said first board and said second board from signals on said data bus, said address bus, said cell available signaling bus, and said enable signaling bus.

6. An inter-board communication system according to claim 5, wherein:

said address means places said address on said address bus and thereby polls a user, and said means for generating a cell available signal returns said cell available signal in response to said to said master within a forty nanosecond period.

7. An inter-board communication system according to claim 2, wherein:
said address means places said address on said address bus and thereby polls a user, and said means for generating a cell available signal returns said cell available signal in response to said to said master within a forty nanosecond period.

8. An inter-board communication system according to claim 1, wherein:
said address means comprises an address latch coupled to said address bus, and an address latch control coupled to said address latch, wherein said address latch and said address latch control receive from the master a first address for a first clock cycle followed by a null address for a second clock cycle, and said address latch generates for output on said address bus said first address bus for said first and second clock cycles.

9. An inter-board communication system according to claim 5, wherein:
said address means comprises an address latch coupled to said address bus, and an address latch control coupled to said address latch, wherein said address latch and said address latch control receive from the master a first address for a first clock cycle followed by a null address for a second clock cycle, and said address latch generates for output on said address bus said first address bus for said first and second clock cycles.

10. An inter-board communication system according to claim 1, further comprising: address remapping means on said at least one second board and coupled to said address bus, said address remapping means for automatically remapping an address received over said address bus to a different address.

11. A telecommunications apparatus utilizing an address bus and a data bus, comprising:
a) an ATM layer device including
  (i) clock means for generating a clock signal;
  (ii) polling means for sequentially generating a series of addresses and for outputting said addresses on the address bus, each address being on said address bus for two immediately adjacent cycles of said clock signal;
  (iii) means for selecting a destination address based on a plurality of cell available signals received by said ATM layer device, and
  (iv) means for sending ATM cell data on said data bus;
b) a plurality of ATM physical devices corresponding to said series of addresses;
c) means associated with said plurality of ATM physical devices for generating and sending a said cell available signal to said ATM layer device in response to an address of said series of addresses when said ATM physical device corresponding to that address can accept said ATM cell data; and
d) electrical connector means for coupling said ATM layer device and said plurality of ATM physical devices, said telecommunications apparatus functioning substantially according to a UTOPIA protocol.

12. A telecommunications apparatus according to claim 11, wherein:
said polling means places addresses on said address bus while said means for sending ATM cell data places the ATM cell data onto said data bus.

13. A telecommunications apparatus according to claim 11, wherein:
said ATM layer device includes means for generating an enable signal and for supplying said enable signal to said means associated with said plurality of ATM physical devices, and
said means associated with said plurality of ATM physical devices includes means for enabling one of said plurality of ATM physical devices to receive said ATM cell data based on an address on said address bus when said enable signal is received means associated with said plurality of ATM physical devices.

14. A telecommunications apparatus according to claim 13, wherein:
said means for generating and sending a cell available signal includes a cell available signaling bus, and
said means for generating and supplying said enable signal includes an enable signaling bus.

15. A telecommunications apparatus according to claim 14, wherein:
said ATM layer device further includes at least one buffer means for hot insertion buffering said ATM layer device from signals on said cell available signaling bus, and said means associated with said plurality of physical devices includes a plurality of buffer means for hot insertion buffering said plurality of physical layer devices from signals on said data bus, said address bus, and said enable signaling bus.

16. A telecommunications apparatus according to claim 15, wherein:
said ATM layer device polls one of said plurality of physical devices and receives a cell available signal over said cell available signaling bus within 40 nanoseconds.

17. A telecommunications apparatus according to claim 12, wherein:
said ATM layer device polls one of said plurality of physical devices and receives a cell available signal over said cell available signaling bus within 40 nanoseconds.

18. A telecommunications apparatus according to claim 11, wherein:
said polling means comprises an address latch coupled to said address bus, and an address latch control coupled to said address latch, wherein said address latch and said address latch control receive from said ATM layer device a first address for a first clock cycle followed by a null address for a second clock cycle, and said address latch generates for output on said address bus said first address bus for said first and second clock cycles.

19. A telecommunications apparatus according to claim 15, wherein:
said polling means comprises an address latch coupled to said address bus, and an address latch control coupled to said address latch, wherein said address latch and said address latch control receive from the master a first address for a first clock cycle followed by a null address for a second clock cycle, and said address latch generates for output on said address bus said first address bus for said first and second clock cycles.

20. A telecommunications apparatus according to claim 11, wherein:
said means associated with said plurality of physical devices further includes address remapping means coupled to said address bus, said address remapping means for automatically remapping an address received over said address bus to a different address.

* * * * *